United States Patent [11] 3,593,381

[72] Inventor Robert W. Ogle
 Newport Beach, Calif.
[21] Appl. No. 720,186
[22] Filed Apr. 10, 1968
[45] Patented July 20, 1971
[73] Assignee IMS Ltd.
 Wilmington, Del.

[54] MULTIPLE-CAVITY MOLD FOR PRODUCING FLASH-FREE PARTS
 3 Claims, 8 Drawing Figs.
[52] U.S. Cl. .................................................. 18/36, 18/42 D
[51] Int. Cl. .................................................. B29c 3/04
[50] Field of Search .................................................. 18/36, 30 WC, 30 I, 30 WJ, 30 WM, 30 WP, 42 M, 42 D, 42 I, 5, 2 RP, DIG. 47, DIG. 42, DIG. 44; 249/205, 187, 134; 156/293; 164/27—32

[56] References Cited
UNITED STATES PATENTS
2,607,080 8/1952 Stewart .................. 18/42 (M)
2,799,049 7/1957 Wilson .................. 18/30
3,077,003 2/1963 Hobson .................. 18/42 (D) X
3,101,065 8/1963 Kalis .................. 18/47 (M) UX
3,372,436 3/1968 Davis .................. 18/42 (I)
3,475,790 11/1969 Bush et al. .................. 18/36

Primary Examiner—J. Spencer Overholser
Assistant Examiner—John E. Roethel
Attorney—Finkelstein & Mueth ABSTRACT: A means wherein a plurality of mold units, each comprising two or more stacked mold bodies, each of which is held and positioned by a carrier plate in coaxial relation to the other mold bodies. The carrier plates permitting limited axial movement of the mold bodies, thereby to permit stacking of the mold bodies in abutting relation irrespective of difference in lengths of the mold units due to manufacturing tolerance. Each uppermost mold body being exposed to the molding material so that the force thereof presses all of the mold bodies of each mold unit into flash free relations.

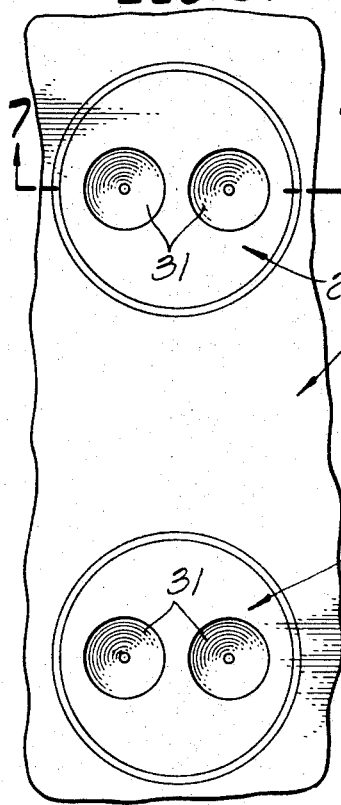
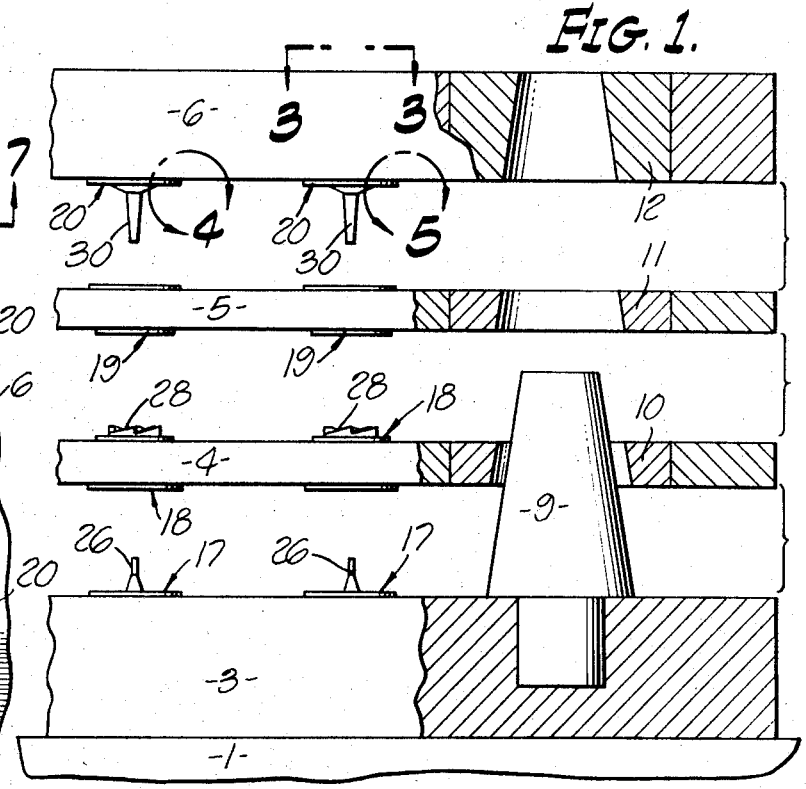
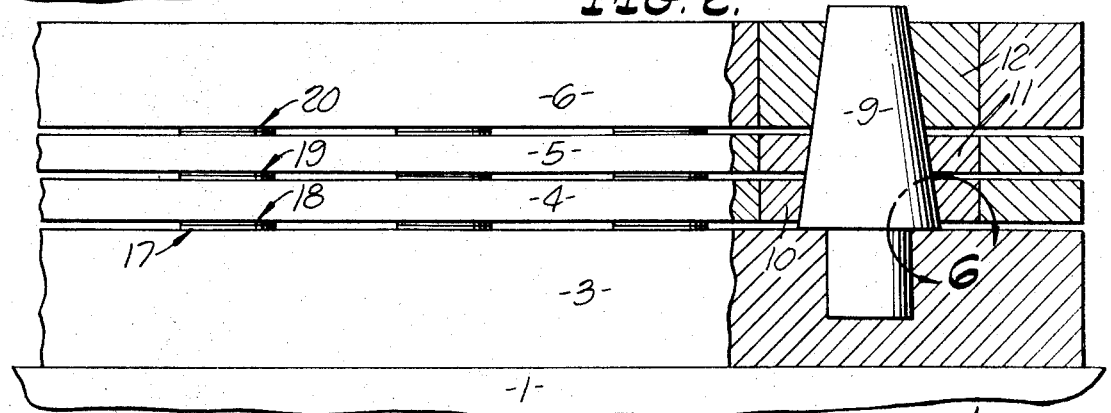
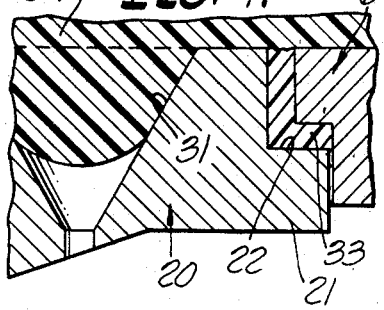
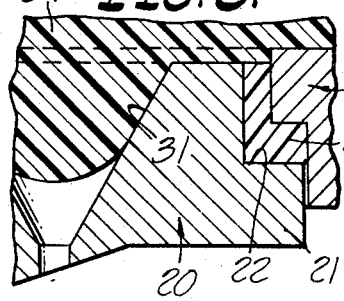
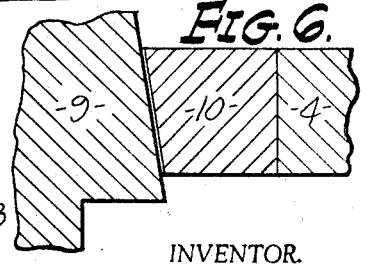
INVENTOR.
ROBERT W. OGLE

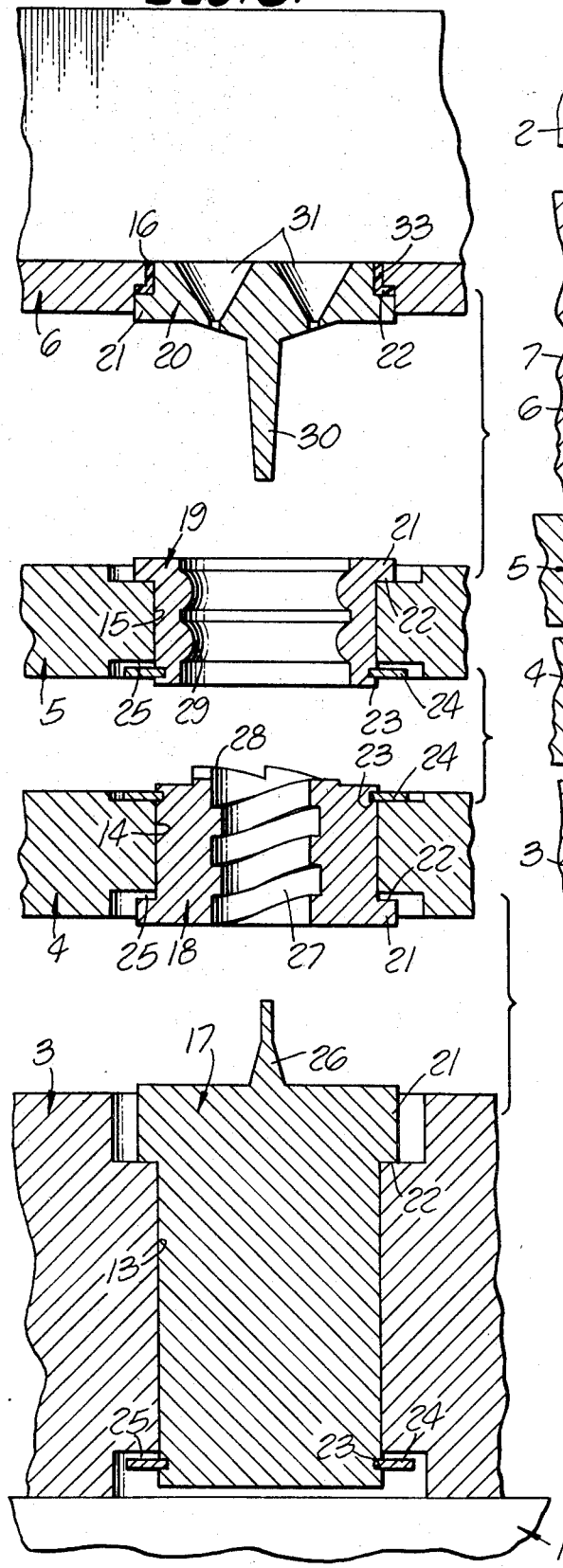
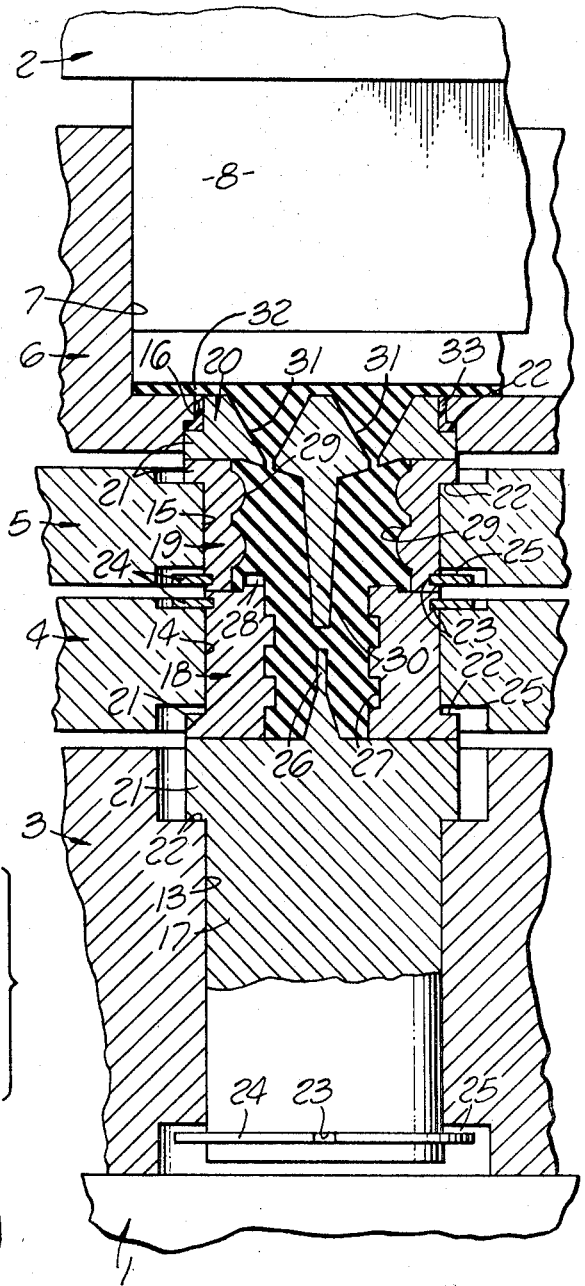

3,593,381

MULTIPLE-CAVITY MOLD FOR PRODUCING FLASH-FREE PARTS

BACKGROUND OF THE INVENTION

This invention relates to the art of multiple molding rubber or rubberlike elastomers as well as plastic parts; more particularly, multiple molding wherein the parts of each mold unit are mounted in a stacked series of carrier plates rather than formed integrally within a mold block.

Due to the fact that it is virtually impossible to make all mold units of a molding assembly, particularly if each mold unit comprises several stacked parts, so that they are precisely the same length, it is virtually impossible to produce parts which are flash free if attempt is made to mold more than one part at a time.

This problem is compounded as the number of mold units are increased. It has heretofor been the practice to circumvent the problem by producing the parts with flash, then trimming the flash or tumbling the parts. This, of course, is a second operation which adds to the cost of manufacture.

The purpose of this invention is to solve this problem so that a large number of parts, each requiring plurality of stacked mold elements, may be produced flash free, therefor the objects of this invention include:

First, to provide a mold assembly having a large number of mold units, each having several mold bodies, and a stacked series of plates for retaining the mold bodies in proper axial relation, yet allowing limited axial movement of the mold bodies to compensate for differences in axial length. Thus, in effect, each mold unit behaves just as if it were the only mold unit in the assembly.

Second, to provide a multiple-unit mold assembly wherein one of the end mold bodies is fixed in its carrier by a cement after its correct position is established.

Third, to provide a mold assembly whereby a large number of mold units, each having several parts, may be incorporated in the mold assembly, and wherein any of the mold units may be removed or replaced without disturbing others.

DESCRIPTION OF DRAWINGS

FIG. 1 is a fragmentary view of the multiple-cavity mold, with the parts shown in their separated condition, and with portions shown in section, and other portions shown in side elevation.

FIG. 2 is a similar fragmentary view of the multiple-cavity mold, partially in section and partially in elevation, with the parts shown in their closed or casting position.

FIG. 3 is an enlarged fragmentary top view, taken from 3-3 of FIG. 1.

FIG. 4 and FIG. 5 are enlarged fragmentary sectional views, taken within circle 4 and circle 5 of FIG. 1, and indicating mold units of different lengths.

FIG. 6 is an enlarged fragmentary sectional view, taken within circle 6 of FIG. 2.

FIG. 7 is an enlarged fragmentary sectional view, confined principally to one mold unit, and taken through 7-7 of FIG. 3, the parts of the mold unit being shown in their closed or casting position.

FIG. 8 is a similar enlarged fragmentary sectional view, showing the mold units in their separated condition.

The multiple-cavity mold herein illustrated comprises a multiplicity of mold units, each divided into four mold parts. Each mold part is held in a retainer. While four mold parts are illustrated, it should be understood that a lesser or greater number of mold parts may be employed.

The mold structure is installed between a conventional bottom platen 1 and top platen 2. The parts of the mold units are supported by a first or bottom carrier plate 3, a second carrier plate 4, a third carrier plate 5, and a fourth or top carrier plate 6. The top carrier plate is provided with a charge-receiving cavity 7 and the top platen is provided with a plunger 8 which descends into the charge-receiving cavity 7.

Outside the region containing the mold units, the bottom carrier plate 3 is provided with tapered centering pins 9, which fit into tapered bushings 10, 11 and 12, provided respectively in the plates 4, 5 and 6.

The mold carrier plates 3, 4, 5 and 6 have respectively, axially aligned sets of mold-receiving bores 13, 14, 15 and 16. The bores receive, respectively, mold unit bodies or parts 17, 18, 19 and 20.

Each mold unit body or part is provided with an enlarged end 21 which may be located at the top or the bottom of the body, and forms a shoulder 22, which limits axial movement of the body in the corresponding bore.

Near its end, opposite from the enlarged end 21, each mold unit body except the upper body 20 is provided with a groove 23 which receives a retainer ring 24. Axial clearance, as indicated by 25, is provided to permit limited axial movement of each mold unit body.

For purposes of illustration, each mold unit is shown as formed to cast a rubber part, having a relatively complex surface. By way of example, the bottom body or part 17 is in the form of a cylinder, having an upstanding recess forming pin 26. The next mold unit body 18 is provided with a screw-threaded bore 27, adapted to cast an externally screw-threaded portion. The upper end of the mold unit body 18 is provided with coarse serrations 28, which mold complementary serrations. The next mold unit body 19 is provided with a bore 29 which is larger than the bore 27, and is contoured to form a pair of annular grooves separated by ribs. The upper mold unit body 20 is provided with a depending pin 30, to cast a recess in the molded part, and is provided with a pair of sprue openings 31.

The mold unit bodies 17, 18, 19 and 20 of each mold unit are adapted to be stacked with their confronting surfaces in abutting relation. Ideally, the members of each set of mold bodies should be exactly the same length. This is, of course, impossible to attain, and in practice a minimal variation in length is tolerated. This manufacturing tolerance is compounded by the fact that several of the bodies are stacked to form the complete mold unit. As a consequence, the position occupied by the upper mold unit body 20 varies, as indicated by a comparison of FIGS. 4 and 5.

Operation of the multiple cavity mold is as follows:

If a charge of molding material 32 is placed in the cavity 7 and pressed downwardly by the plunger 8, the molding material will exert a downward force on each mold unit which is independent of the force applied to the other mold units. This force is sufficient to hold the abutting surfaces of the mold bodies in firm, flash free contact. It should be noted that if concentricity tolerances permit, the mold bodies may have free-sliding fit in their respective bores; otherwise, the fit may be a tight press fit which will permit the necessary axial displacement in response to the force exerted on the area of each mold unit. A tight press fit is avoided not only because of the need for axial displacement, but also because of the resulting tendency of the carrier plates to warp.

Whatever molding material may be used, it is in a highly fluid state while it is filling the mold cavities. Consequently, leakage will occur around the members of the upper set of mold bodies. This is readily avoided by placing a bonding resin 33 in the space between each mold unit body 20 and its bore 16, as indicated in FIGS. 7 and 8. A number of materials are suitable; however, a curable epoxy resin has been found to be satisfactory. Before the resin has set, a disc of yieldable plastic material 34, having a higher softening temperature than the molding material, is substituted for the charge of molding material 32. Polytetrafluoroethylene has been found satisfactory. The molding press is closed and pressure applied to the plastic disc 34 and heat is applied through the platens to cause the resin 33 to set, locking each upper mold unit body 20 in its proper position to compensate for any variation in length of the mold unit.

The plastic disc is then removed and the multiple-cavity mold is in condition for use. Tests have demonstrated that any desired number of mold units may be employed and that each will cast a product which will be entirely free of flash. It will be noted that no loads are applied to the carrier plates which would cause the plates to warp, so that exceptionally long runs may be obtained without further adjustment. Should a flash condition occur, it is merely necessary to press the misplaced mold unit body 20 from its bore, replace with bonding resin, reinsert a plastic disc 34, and apply pressure until the resin has set.

While the members of the lowermost set of mold bodies are independent of each other, this set may be formed in a single block and only the mold bodies above need be separate from each other and retained by carrier plates.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:

1. A multiple-cavity mold structure adapted to be disposed between an upper and a lower platen, the upper platen having a plunger, said mold structure comprising:
   a. a plurality of mold units including an upper set of mold bodies and a lower set of mold bodies, each mold unit forming a mold cavity and having sprue opening entering the upper end of its upper mold body;
   b. a lower carrier having a set of bores slidably receiving said lower set of mold bodies;
   c. means limiting upward movement of said lower set of mold bodies with respect to said lower carrier;
   d. an upper carrier having a cylinder to receive said plunger and a charge of molding material and terminating in a bottom wall; said upper carrier also having a set of bores intersecting said bottom wall and slidably receiving said upper set of mold bodies;
   e. means for limiting upward movement of said upper set of mold bodies;
   f. said means for limiting upward movement of said upper set of mold bodies comprising a sealing and bonding material interposed between the upper carrier and the members of said set of upper mold bodies to secure said upper mold bodies in mold unit length compensating positions;
   g. the members of said upper set of mold bodies, when in molding position, being exposed to the force exerted by said molding material upon being pressed by said plunger, and clear of the upward movement limiting means, each member of said upper set of mold bodies is forced individually toward and is limited in its movement by its mating lower mold body irrespective of variations in length of said mold units;
   h. said carriers being connected with said platens to effect separation of said mold units on separation of said platens.

2. A multiple-cavity mold structure adapted to be disposed between an upper and a lower platen, the upper platen having a plunger, said mold structure comprising:
   a. a plurality of mold units each including an upper set of mold bodies, a lower set of mold bodies, and at least one set of intermediate mold bodies, each mold unit forming a mold cavity, and having a sprue opening communicating therewith throughout its upper mold body;
   b. carriers for said sets of mold bodies including bores slidably receiving said mold bodies;
   c. means for limiting axial movement of said mold bodies with respect to said carriers;
   d. a cylinder for receiving said plunger and a charge of molding material, the upper carrier closing the lower end of said cylinder and the ends of the upper set of mold bodies being exposed to said molding material and subject to the force exerted thereby when said material is pressed by said plunger;
   e. a sealing and bonding material interposed between the upper set of mold bodies and said upper carrier to fix the members of said upper set of mold bodies in their various positions relative to said upper carrier;
   f. each mold unit, when in molding position, being supported individually from said lower platen and the members thereof being in abutting relation, the upper mold bodies projecting different distances into the cavity formed by said cylinder an upper carrier in accordance with differences in the lengths of said mold units;
   g. said carriers being connected with said platens to effect separation of said mold units on separation of said platens.

3. A multiple-cavity mold structure adapted to be disposed between an upper and a lower platen, the upper platen having a plunger, said mold structure comprising:
   a. a plurality of mold units including at least an upper set of mold bodies and a lower set of mold bodies, said sets varying in length due to manufacturing tolerances, and the members of said upper set of bodies having sprue openings;
   b. means for holding the bodies of each mold unit in coaxial relation, said means permitting limited axial movement of at least said upper set of mold bodies, whereby said mold bodies may stack in abutting relation irrespective of differences in cumulative length of said mold units;
   c. bonding material for securing said upper set of mold bodies in positions compensating for differences in length of said mold units;
   d. means common to said mold units for receiving a charge of molding material, each member of the upper set of mold bodies being exposed thereto; whereby the mold bodies of each set are forced by said molding material into material contact irrespective of said differences in length of said mold units.